United States Patent [19]

Jiles

[11] Patent Number: 5,595,207
[45] Date of Patent: Jan. 21, 1997

[54] TENSION ACTUATED GAS SHUTOFF VALVE

[75] Inventor: Stephen L. Jiles, Anaheim, Calif.

[73] Assignee: Southern California Gas Company, Los Angeles, Calif.

[21] Appl. No.: 325,663

[22] Filed: Oct. 19, 1994

[51] Int. Cl.$^6$ ............................................. F16K 17/36
[52] U.S. Cl. .............................. 137/38; 251/148; 251/347
[58] Field of Search ..................... 137/38, 615; 251/347, 251/349, 353, 148

[56] References Cited

U.S. PATENT DOCUMENTS

| 450,679 | 4/1891 | Perkins ................................ 251/353 |
|---|---|---|
| 2,088,656 | 8/1937 | Lamb .................................. 251/347 X |
| 2,834,520 | 5/1958 | Nyden . |
| 2,901,153 | 8/1959 | Collins . |
| 3,219,278 | 11/1965 | Santarelli ........................... 251/353 X |
| 4,134,416 | 1/1979 | Lallement et al. . |
| 4,413,643 | 11/1983 | Wiklund . |
| 4,449,544 | 5/1984 | Vernor et al. . |
| 4,817,657 | 4/1989 | Kovacs . |
| 5,240,025 | 8/1993 | Morris . |

FOREIGN PATENT DOCUMENTS

| 096845 | 6/1955 | France . |
|---|---|---|
| 114069 | 7/1982 | Japan ....................................... 137/38 |
| 72777 | 4/1983 | Japan ....................................... 137/38 |
| 799645 | 8/1958 | United Kingdom .................... 251/349 |
| 911799 | 11/1962 | United Kingdom . |

*Primary Examiner*—Stephen M. Hepperle
*Attorney, Agent, or Firm*—Lyon & Lyon

[57] ABSTRACT

A tension actuated gas shutoff valve having a body with an inlet for receiving gas flow along a flow path from upstream to downstream and a piston slidable within the body. The piston slides in response to a longitudinal force applied across the valve between a first position wherein flow through the valve is prevented and a second position wherein flow through the valve is permitted.

6 Claims, 5 Drawing Sheets

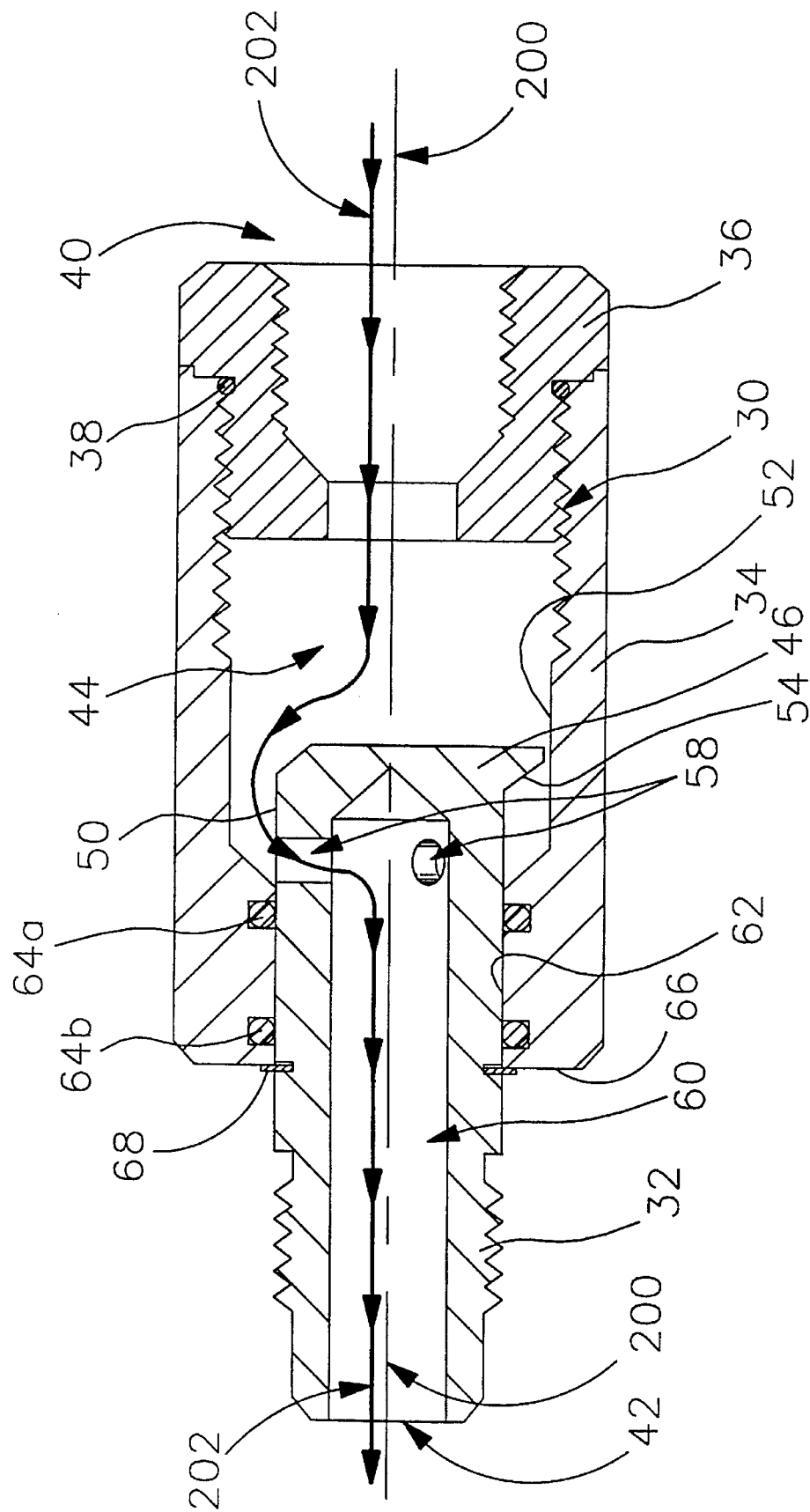

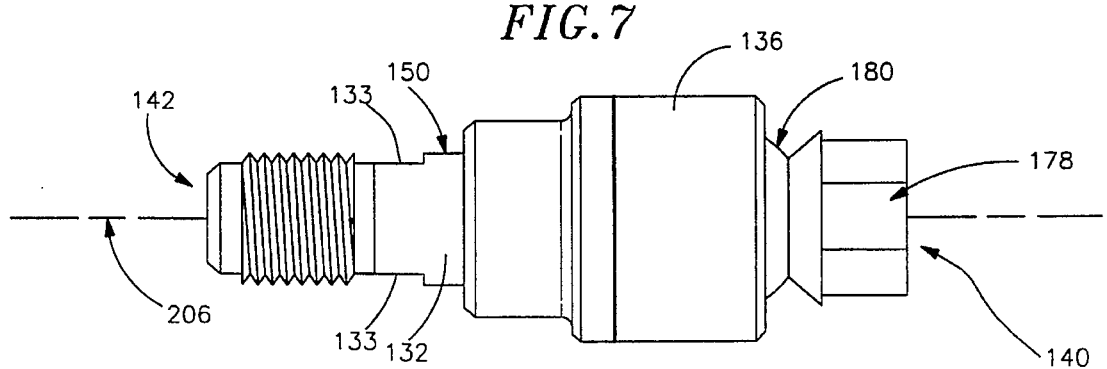
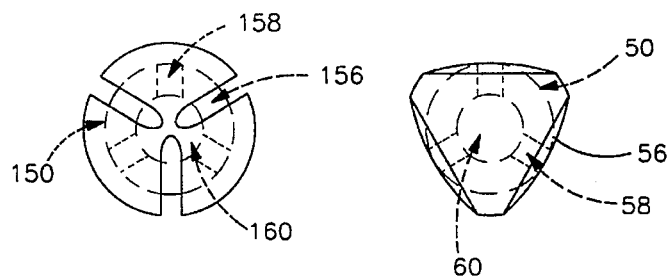
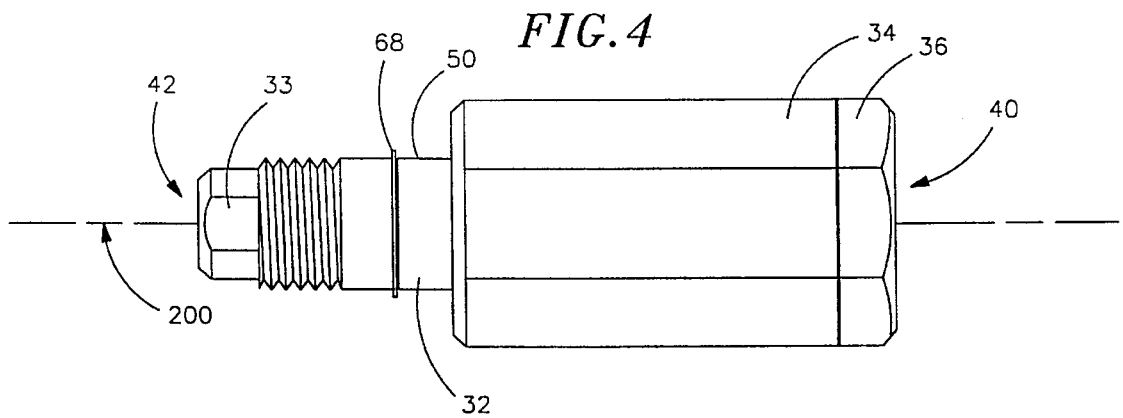

5,595,207

TENSION ACTUATED GAS SHUTOFF VALVE

FIELD OF THE INVENTION

The invention pertains to valves. More particularly, the invention pertains to safety valves which interrupt gas flow to a gas-powered device during an earthquake or other seismic event.

BACKGROUND OF THE INVENTION

In the natural gas industry and, more particularly, in the field of residential natural gas service, earthquake safety is an area of major concern. The industry is faced with issues relating both to preventing damage arising directly out of seismic events and preventing damage and reducing service workload arising out of customers' responses to seismic events.

During an earthquake, vibrations are transmitted through the structure of a building to appliances and other items which are situated within the building. For a variety of reasons, an appliance which is situated adjacent a wall will often tend to "walk" away from the wall during an earthquake. In some cases, the appliance will even fall over.

After an earthquake, if there is a damaged appliance, the homeowner or building resident will typically shutoff the main service to the home or building. This terminates gas flow to all of the appliances in the home, even ones which were not affected by the quake. To return service, a utility technician must relight all the pilot lights of these various appliances.

It is, therefore, desirable to provide a valve which is adaptable to be used in association with an individual gas-powered appliance for interrupting gas flow to that specific appliance if the appliance is disturbed during an earthquake, while not affecting the operation of other appliances in a building.

SUMMARY OF THE INVENTION

There is accordingly provided in practice of a preferred embodiment of the present invention a tension-actuated gas shutoff valve. The valve has a body with an inlet for receiving gas flow along a flow path from upstream to downstream and a piston slidable within the body along a body axis having a piston outlet at a downstream end axially opposite the body inlet. The piston slides in response to a longitudinal force applied across the valve between a first position wherein flow through the valve is prevented and a second position wherein flow through the valve is permitted.

BRIEF DESCRIPTION OF THE DRAWINGS

FIG. 2a is a side cross-sectional view of a valve according to principles of the invention shown in an open position;

FIG. 3 is a view of the head of the piston of the valve of FIGS. 2a–c;

FIG. 4 is a side elevational view of the valve of FIG. 2a;

FIG. 6 is a view of the head of the piston of the valve of FIGS. 5a–c; and

FIG. 7 is a side elevational view of the valve of FIG. 5b.

DETAILED DESCRIPTION

Figure 1:
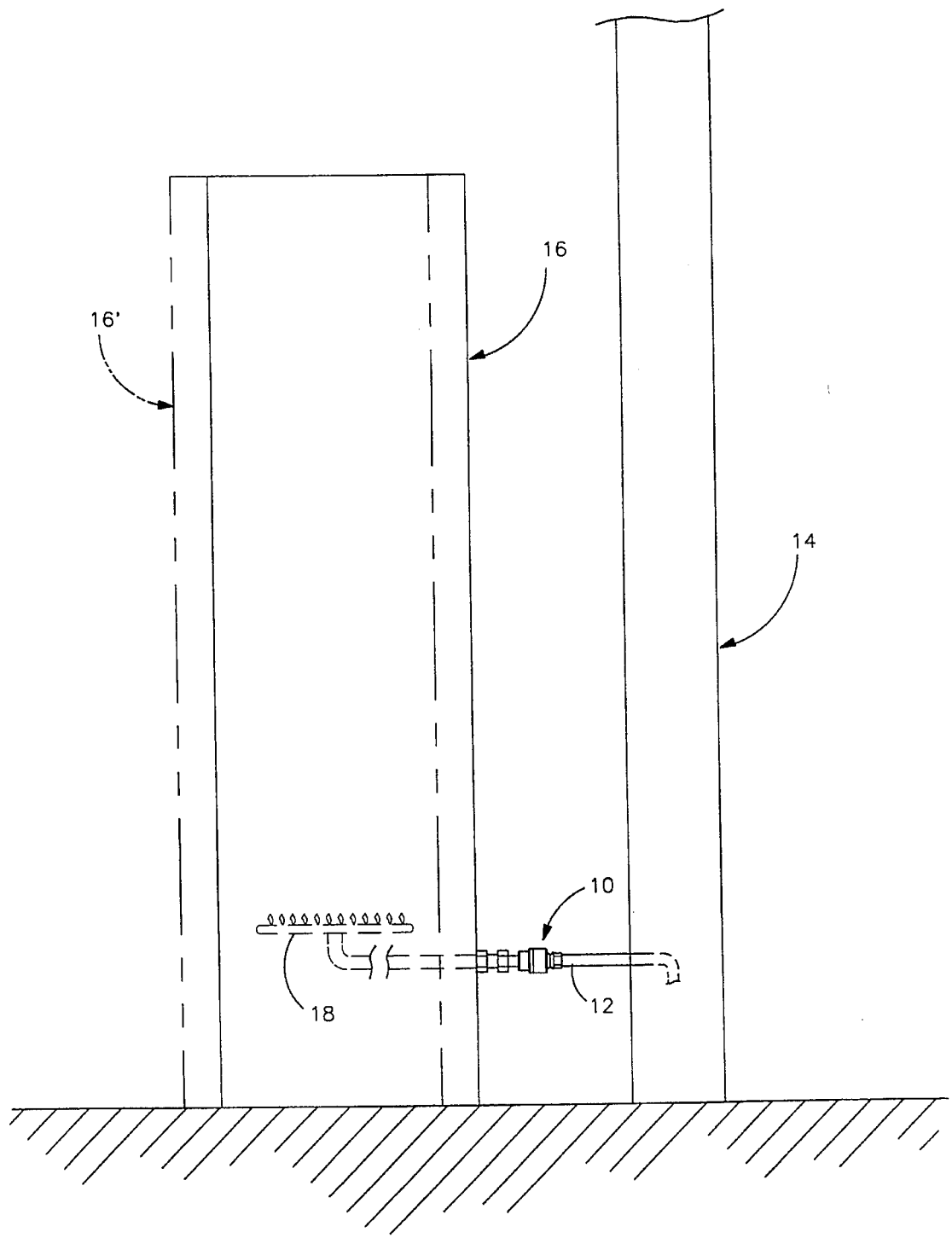
FIG. 1 is a semi-schematic view of a shutoff valve according to principles of the invention shown in-line in a gas line between a building wall and a gas-powered appliance.

As is shown in FIG. 1, a natural gas delivery system includes a valve 10 in-line in a gas supply line 12 which extends from a building wall 14 to a gas-powered appliance 16 shown schematically as a hot water heater. During an earthquake or other seismic event, the appliance will have a tendency to walk away from the wall, thereby placing the line under tension.

As is described in detail hereinbelow, the valve is initially in a retracted position corresponding to the solid line position of the water heater 16. With the valve in this position, flow is permitted through the line 12 and valve 10 to a burner 18 held within the structure of the heater. Upon occurrence of an earthquake, the valve extends, allowing the appliance to move to a position shown by the broken line appliance 16' (exaggerated in the figure). The valve is thus moved into an extended position wherein flow through the line and valve is prevented.

Figure 2B:
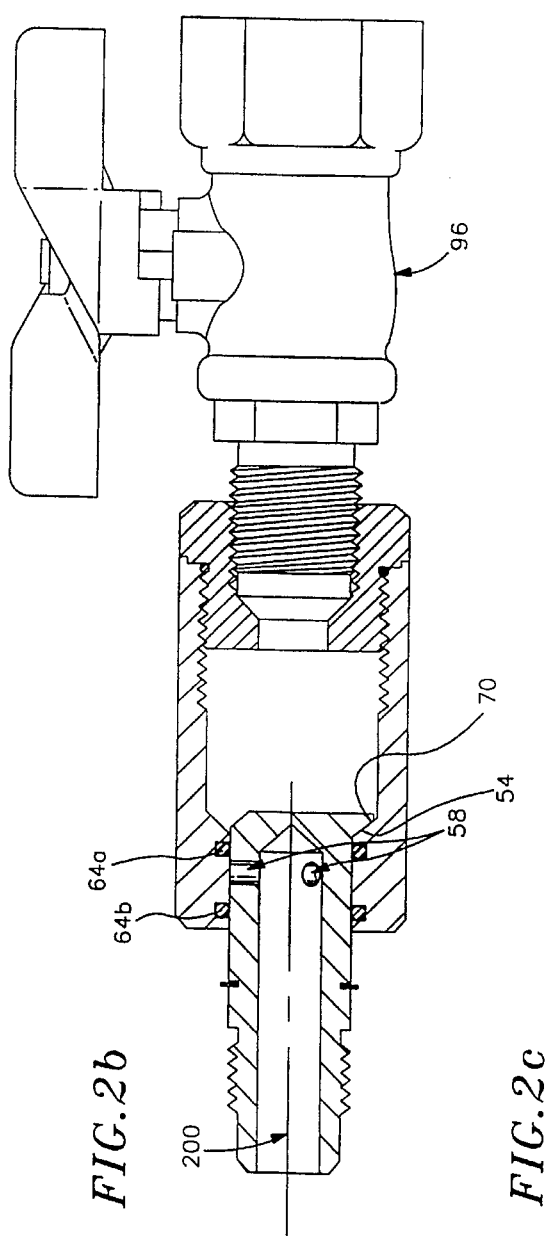
FIG. 2b is a side cross-sectional view of the valve of FIG. 2a shown in a closed position and connected to a stopcock.

FIG. 2a shows an exemplary valve in a retracted position. The valve includes a body 30 and a piston 32 slidable within the body along a central axis 200 of the body. The valve is shown in an extended position in FIG. 2b and FIG. 4. As shown in FIG. 4, the piston has, adjacent its downstream end, a pair of radially opposed flats 33 to facilitate gripping of the piston during manufacture. The body includes a casing 34 which, at its downstream end, engages the piston and, at its upstream end, is internally threaded to receive an externally threaded end cap 36. The casing and end cap are both of hexagonal external section. The end cap is sealed to the casing by an O-ring 38 carried by the end cap about the base of its threaded portion. An internally threaded inlet 40 which may be connected to an upstream portion of the line 12, is formed in the end cap 36. An externally threaded outlet 42 for connection to a downstream portion of the line is formed at the downstream end of the piston.

With the piston in the retracted position of FIG. 2a, gas flows along a flow path 202 from the upstream inlet 40 through to a central cavity 44 within the body casing. The piston has a head 46 with an upstream face 48 exposed to the central cavity 44 and defining the upstream end of the piston. The flow path proceeds around the head to an annular portion of the cavity between a cylindrical peripheral surface 50 of the piston and the interior casing wall 52. The head extends radially beyond the cylindrical peripheral surface and has a beveled rearward facing surface 54. To facilitate flow around the head, the head has three reliefs 56 (FIG. 2a & FIG. 3) formed as planar facets facing upstream and radially outward and situated opposed each other by 120° about the axis 200.

The flow path proceeds through three apertures 58 extending radially inward from the cylindrical peripheral surface 50 to a central longitudinal bore 60. The bore extends upstream from the outlet 42, terminating downstream of the head. The flow path proceeds through the bore and out the outlet.

The piston is accommodated within a cylindrical bore 62 adjacent the downstream end of the casing and carrying a pair of upstream and downstream O-rings 64*a* and 64*b*, respectively. The O-rings engage the cylindrical peripheral surface of the piston to seal the piston and body. As can be seen, in the retracted position the apertures 58 are located upstream of the O-rings and cylindrical bore 62. As is further shown in FIG. 2*a*, the upstream movement of the piston is stopped by the interaction of the downstream end 66 of the body/casing and a lock ring 68 riding in an outwardly facing annular slot in the piston.

When the valve is placed under a tensile force, the piston slides downstream from the retracted position of FIG. 2*a* to an extended position of FIG. 2*b*. In this position, the apertures 58 lie between the upstream and downstream O-rings 64*a* and 64*b*. Downstream movement or extension of the piston is stopped by the interaction of the beveled rear face 54 of the piston head with a downstream shoulder 70 within the cavity. In this extended position, the apertures 58 are no longer exposed to the cavity 44 so that flow through the valve is prevented.

It is accordingly seen that the valve is operatively installed within the line 12 in the retracted position whereby flow is permitted through the line and valve to the appliance. The "walking" effect observed during an earthquake places the line and valve under tension causing the appliance to move to the broken line showing 16'. The valve is thus extended, preventing flow through the line and valve to the appliance.

As an option shown in FIG. 2*b*, a stopcock 96 is connected to the valve inlet. In service, after an earthquake causes the valve to extend, the stopcock facilitates the relighting of a pilot by allowing a technician to initially close the stopcock whereupon the appliance may be repositioned, retracting the valve, without producing a gas flow. When the technician is ready to relight the pilot, the stopcock is opened to restart the flow through the line to the appliance.

Figure 2C:
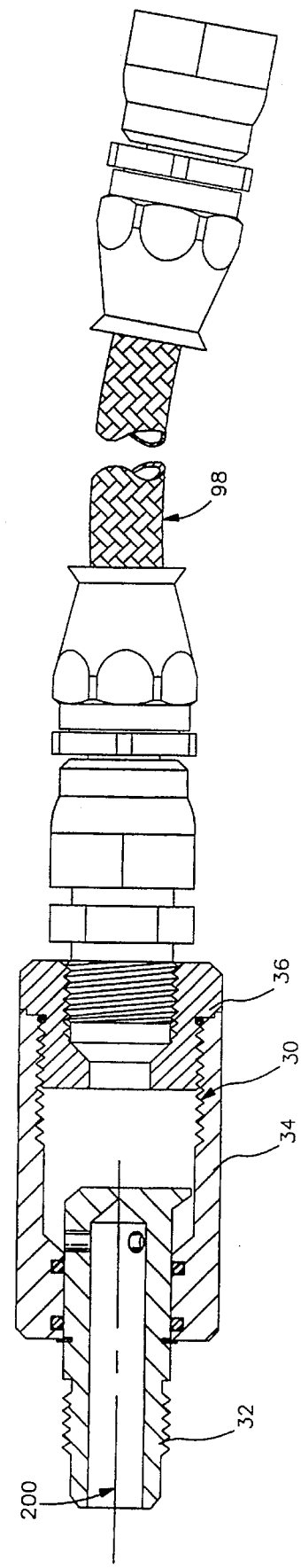
FIG. 2c is a side cross-sectional view of the valve of FIG. 2a in an open position and connected to a flexline.

As shown in FIG. 2*c* another option is to connect a flexible line or "flexline" 98 to the valve inlet. The flexline allows the appliance to move (especially to rotate or twist) without damaging the line 12. The flexline thus helps prevent the line 12 from bending, kinking or even fracturing during an earthquake. The flexline may, optionally, be placed in series with the stopcock to achieve a combined benefit.

Figure 5A:
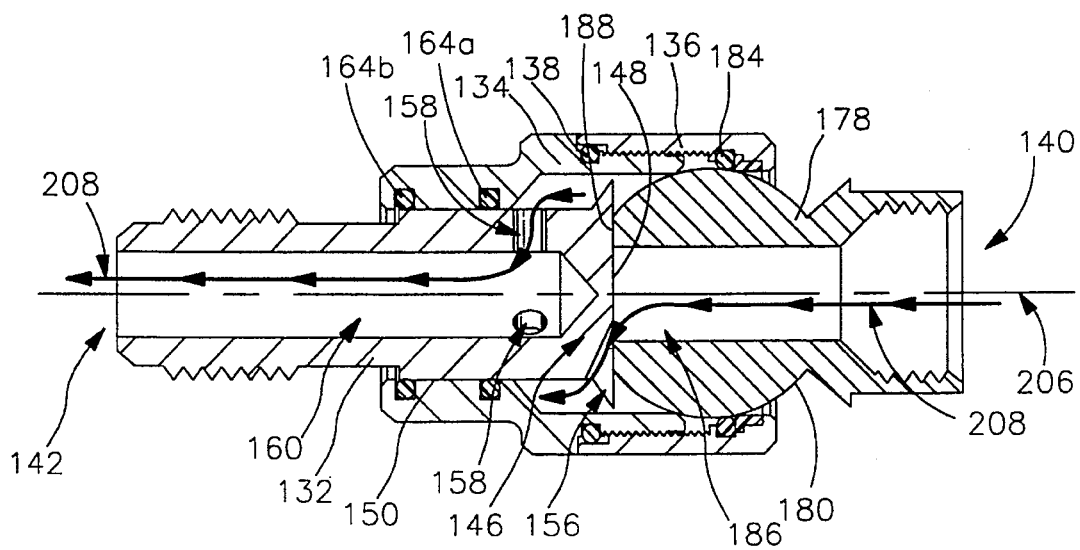
FIG. 5a is a side cross-sectional view of a valve according to principles of the invention in an open position.
Figure 5B:
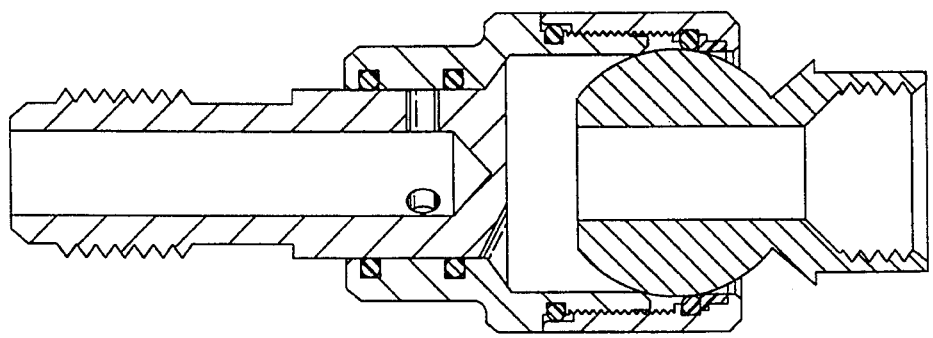
FIG. 5b is a side cross-sectional view of the valve of FIG. 5a in a closed position.

An alternative to the flexline is to provide the valve with a ball joint which permits relative rotation of the valve inlet and outlet so as to help accommodate twisting movements of the appliance. Such a valve is shown in FIGS. 5*a*–*c* wherein elements corresponding to elements of the embodiment of FIGS. 2*a*–*c* are shown with like reference numeral plus 100 and, except where desirable to facilitate an understanding of the embodiment, are not described further.

The internally threaded valve inlet 140 is defined by a port at the upstream end of a ball member 178 having a spherical surface portion 180. About the inlet, the ball member is of hexagonal external section to facilitate gripping with a wrench when the valve is installed or removed from an upstream line. Similarly, a pair of radially opposed flats 133 on the piston, upstream of its threaded portion, facilitates connection or disconnection of the piston from a downstream line. The ball is rotatably held relative to the casing 134 by an end cap 136. The downstream end of the end cap is internally threaded to engage an externally threaded upstream end of the casing. An O-ring 138 carried in an annular slot at the base of the threaded portion of the casing provides a seal between the casing and end cap. Adjacent the upstream end of the end cap 136, a spacer 182 and O-ring 184 respectively provide a bearing surface and a seal engaging the spherical surface of the ball to retain it within the end cap and prevent the escape of gas.

The ball has a central longitudinal bore 186 extending from the inlet 140 through the ball to its annular downstream face 188. With the piston in the retracted position of FIG. 5*a*, the annular downstream face 188 of the ball engages the upstream face 148 of the piston. To permit flow along the flow path 208, the head 146 has three channels 156 (FIGS. 5*a* & 6) which extend radially outward from a central portion of the upstream face 148 and are angled slightly downstream. The channels direct the gas flow to the annular portion of the cavity between the cylindrical peripheral surface 150 of the piston and the interior casing wall 152 and thus to the apertures 158. It can thus be seen that the upstream movement of the piston is stopped by the interaction of the ball and piston head. The downstream movement of the piston to the extended position of FIG. 5*b* closes the valve in similar fashion to the valve of FIG. 2*b*.

Figure 5C:
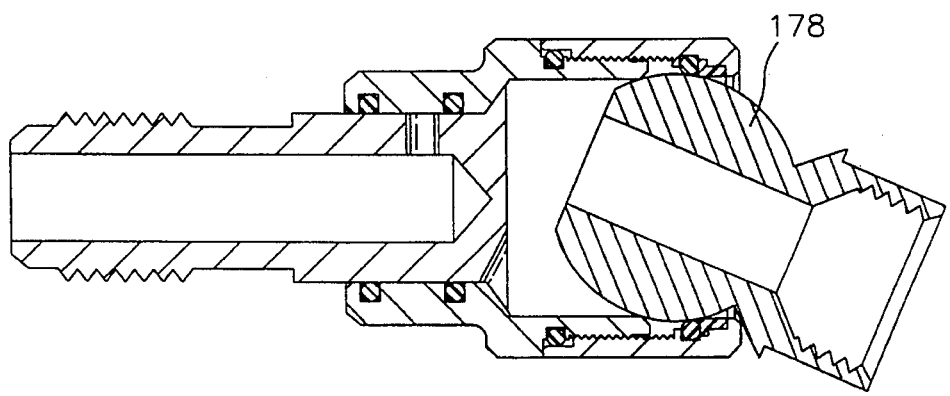
FIG. 5c is a side cross-sectional view of the valve of FIG. 5a in a closed position with a ball joint shown in a rotated orientation.

As shown in FIG. 5*c*, when subject to a torque, the ball 178 rotates relative to the rest of the valve, the ball having at least two rotational degrees of freedom (pitch and yaw relative to the axis 206).

While presently preferred embodiments of a shutoff valve have been described and illustrated herein, a variety of other constructions and features are possible. Valves according to principles of the invention may be adapted to particular situations by those skilled in the art. For example, a three position version of the valve would provide for an open position located in between two closed positions so that either tensile or compressive forces would shut the valve. Additionally, although the valves are illustrated with an operationally preferred direction, they would still function if reversed so as to reverse upstream and downstream directions.

Although individual valves may be installed with existing appliances, appliances may be manufactured or distributed so as to already include such a valve. Thus a seismically responsive natural gas powered appliance would have an extensible valve member on which is formed the gas inlet to the appliance (corresponding to the body of the illustrated valve) and a member fixed relative to the structure of appliance (corresponding to the illustrated piston), the longitudinal force between the supply line and valve moving the extensible member to interrupt flow.

Accordingly, the described embodiments are only considered to be preferred and illustrative of the invented concept. It is, therefore, to be understood that, within the scope of the appended claims, the invention may be practiced otherwise than as specifically described.

What is claimed is:

1. A valve comprising:

a body having a body axis and an inlet formed on a ball joint at an upstream end for receiving a fluid flow along a fluid flow path from upstream to downstream;

a piston, having a piston outlet at a downstream end axially opposite the body inlet, and slidable within the body along the body axis, in response to a longitudinal force applied across the valve, to slide between a first position wherein flow through the valve is prevented and a second position wherein the flow through the valve is permitted.

2. The valve of claim 1 wherein the ball joint is integral with the body.

3. The valve of claim 2 wherein the body comprises a casing and an end cap threadably engaged to the casing and wherein a ball member of the ball joint engages a socket formed in the end cap.

4. A valve, for regulating a fluid flow along a fluid flow path from an upstream inlet to a downstream outlet, comprising:

a casing;

a piston, slidable within the casing along a casing axis and having a port which defines said valve outlet;

a ball member having a spherical surface portion rotatably held relative to said casing and having a port which defines said valve inlet, wherein the piston is moveable in response to a longitudinal force applied across the valve to slide between a first position wherein flow through the valve is prevented and a second position wherein the flow through the valve is permitted.

5. The valve of claim 4 wherein the longitudinal force is tensile, whereby the first position is downstream of the second position and the piston is relatively extended in the first position and retracted in the second.

6. A seismically responsive natural gas powered appliance comprising:

a structure;

a burner held by the structure; and a gas inlet for attachment to a gas supply line for supplying gas to the burner, wherein the inlet is formed on an extensible valve member which is extensible relative to a fixed valve member fixed relative to the structure, the extensible valve member moveable in response to a longitudinal force to slide between a first position wherein flow to the burner is prevented and a second position wherein the flow to the burner is permitted.

* * * * *